United States Patent [19]

D'Amaddio et al.

[11] 4,105,556

[45] Aug. 8, 1978

[54] LIQUID WASTE PROCESSING SYSTEM

[75] Inventors: Eugene Raymond D'Amaddio, Enfield; David Norman Enegess, Broad Brook, both of Conn.

[73] Assignee: Combustion Engineering, Inc., Windsor, Conn.

[21] Appl. No.: 659,053

[22] Filed: Feb. 18, 1976

[51] Int. Cl.² .............................................. B01D 35/00
[52] U.S. Cl. ................................ 210/152; 210/257 M; 210/259; 210/206
[58] Field of Search ...................... 210/22, 23 H, 23 R, 210/23 F, 152, 251, 257 M, 206, 411

[56] References Cited

U.S. PATENT DOCUMENTS

| 3,526,320 | 9/1970 | Kryzer | 210/257 M X |
| 3,632,505 | 1/1972 | Nelson | 210/23 H X |
| 3,654,148 | 4/1972 | Bradley | 210/257 M X |
| 3,757,005 | 9/1973 | Kautz et al. | 210/321 A X |
| 3,880,755 | 4/1975 | Thomas et al. | 210/194 X |
| 3,973,987 | 8/1976 | Hewitt et al. | 210/23 H |

OTHER PUBLICATIONS

A. Gouveia et al., "Potable Water From Hospital Wastes by Reverse Osmosis", Sym. Series, CEP, 1968, vol. 64, No. 90, pp. 280-284.

Primary Examiner—Frank A. Spear, Jr.
Assistant Examiner—E. Rollins Cross

[57] ABSTRACT

A reverse osmosis liquid waste processing system for purifying liquid waste. The liquid waste processing system comprises a liquid waste collection tank with a recirculation line containing an eductor for permitting the addition of chemical additives, a filter with a back-flushing circuit and a reverse osmosis module which delivers its concentrate to a thin-film evaporator and its permeate to an ion exchanger.

4 Claims, 1 Drawing Figure

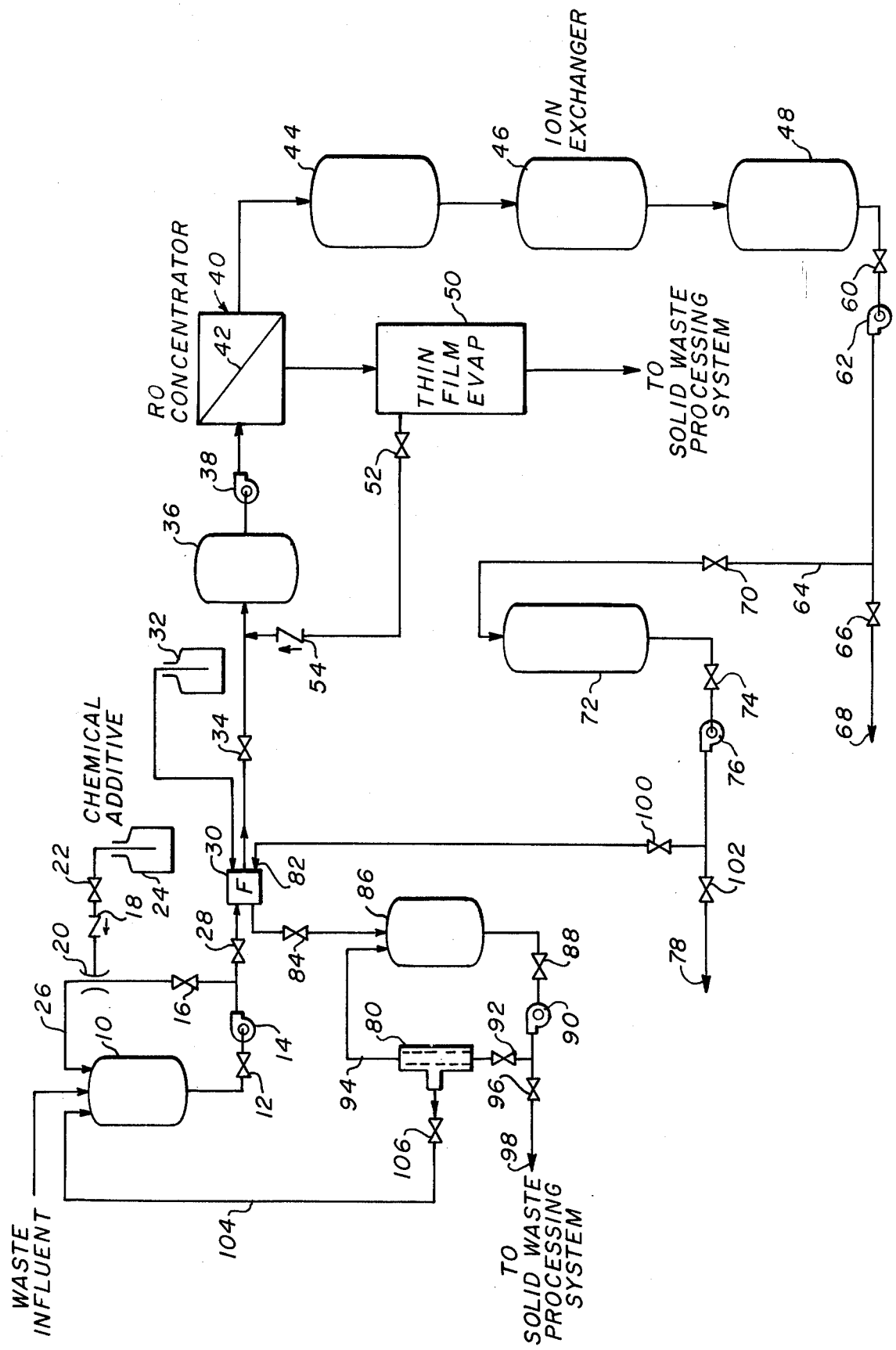

LIQUID WASTE PROCESSING SYSTEM

BACKGROUND OF THE INVENTION

This disclosure relates to a liquid waste processing system for purifying liquid wastes containing dissolved or suspended impurities. More specifically, this disclosure relates to the removal of solid and dissolved radioactive wastes contained in liquid waste generated in nuclear power plants.

The viability of the continued operation of nuclear reactors in and around our present communities, and indeed the continued operation of all processes which produce liquid waste such as pulp and paper industries and food processing industries, depends heavily upon the ability of the utility or the industry to clean up the liquid wastes that are generated by the processes. If an appropriate degree of purification of the liquid wastes can be obtained, the resulting purified liquids can be released to the environment or recycled in the system leaving only the concentrated solid wastes to be disposed. Current concern for the purity of the environment has led to increasingly strict controls on the disposal of such waste streams. As one example, the U.S. AEC (now the NRC) has recently promulgated a "final environmental statement concerning numerical guides for design objectives and limiting conditions for operation to meet the criterion 'as low as practicable' for radioactive material in light-water-cooled nuclear power reactor effluents." These guides establish minimum decontamination factors for liquid waste treatment processes. Briefly, the AEC requirement is that discharges of radioactive material from utility operated nuclear power plants be "as low as practicable."

The commonly practiced method employed to dispose of liquid wastes generated in nuclear power plant cycles consists of the evaporation of the waste feed streams. The resulting condensate is sufficiently clear of solids and radioactivity to be discharged freely and the resulting concentrate is contained (drummed or solidified) for controlled disposal.

The commonly practiced prior art techniques, however, have the disadvantages that they induce substantial capital and operating costs, require extensive maintenance, have lengthly start-up times and occupy large amounts of building space. Most prior art rad-waste systems employ forced-circulation evaporators which consume large amounts of steam cooling water and electricity. In addition, forced and natural circulation evaporators require highly complex instrumentation and controls in order to balance all the operating parameters involved in proper unit operation. Nuclear experience with these prior art units indicates that the controls are difficult to adjust and seldom work as designed.

Accordingly, a need is felt for a less expensive, less complex system which can process radioactive liquid waste with the production of a low-radioactive effluent which may be discharged to the environment without environmental degradation.

SUMMARY OF THE INVENTION

The liquid waste processing system herein disclosed meets these objectives by first chemically treating the waste liquid, second filtering out the solid particles of waste liquid in a back-flushable filter, third processing the liquid wastes by a reverse osmosis module, and finally concentrating the concentrate in a thin-film evaporator. The chemical treatment is accomplished by means of a collection tank, a recirculation line and pump, and an eductor which draws the desired chemical additives into the recirculation line. After an appropriate degree of chemical pretreatment has been accomplished, the liquid waste is pumped from the holding tank through a filter which removes a large fraction of the particulate and precipitated solids. The filtered waste liquid is then treated by a reverse osmosis module which results in an extremely pure permeate and a concentrate containing the undesirable elements. This concentrate is next passed to a thin-film evaporator which further concentrates the concentrate. The distillate from the thin-film evaporator is recycled to the inlet of the reverse osmosis module while the concentrate from the thin-film evaporator is discharged to the solid waste processing system. The permeate from the reverse osmosis module may be further purified by an ion exchanger and either discharged to the environment or recycled into the system as a relatively pure and useful liquid. One use for the recycled liquid is to use the recycled liquid as a back-flush fluid for the filter upstream of the reverse osmosis module. The back-flush fluid, after having cleaned the back-flushable filter, is collected in a collection tank and treated by an inertial filter. The clear filtrate effluent from the inertial filter is then returned to the original holding tank for recycle through the liquid waste processing system and the solid concentrates are periodically drained from the system and delivered to a solid waste processing system.

A DESCRIPTION OF THE DRAWING

FIG. 1 is a diagrammatical illustration of the liquid waste processing system.

DESCRIPTION OF THE PREFERRED EMBODIMENT

Referring to the FIGURE, the stream of waste fluid or waste influent is first collected in the waste tank 10. Periodic sampling of this tank 10 provides an indication of waste chemistry. By knowing the waste chemistry it is possible to determine which chemical additives are required to accomplish precipitation of most of the dissolved solids in the waste water and to adequately adjust the pH of the fluid. When a sufficient volume of waste influent has been collected in waste tank 10, valves 12 and 16 are opened and valve 28 is closed. This provides a recirculation line 26 which includes motivating pump 14 and an eductor 20. The suction inlet of the eductor 20 may be connected to a chemical additive container 24 by means of line 21 which includes check valve 18 and control valve 22. As a result of this arrangement, when valve 22 is in the open position and pump 14 is circulating fluid through line 26, chemical additives are drawn from container 24 into the line 26 through the suction inlet of the eductor 20. This arrangement has the advantage that any number of different additives can easily be added to the contents of the waste tank 10 simply by switching additive bottles 24 as opposed to a conventional system in which chemical additives are added through a metering pump and a tank with associated valving and instrumentation. The conventional system, however, is more complicated than the system described herein and is therefore more costly. In addition, the arrangement of a conventional system would require many tanks and plumbing servicing those tanks or would require that the additive tank be emptied and flushed before the next chemical additive is available for addition to the system. Accordingly, the conventional system lacks the flexibility and the ease inherent in the apparatus of the invention with which different chemical additives can be added to the liquid waste processing system.

The appropriate chemicals to be added include acid or base for pH adjustment. The pH range is of utmost importance when a reverse osmosis module is to be used due to current state of the art reverse osmosis membranes. In addition, the chemicals can be selected to cause a chemical reaction with the dissolved solids in the liquid waste influent to cause solid precipitation. After sufficient amounts of chemical have been added, valve 22 may be closed and pump 14 continues pumping to recirculate the chemically treated liquid wastes to promote mixing. Once sufficient mixing has been accomplished the precipitate and other particulate solids can be removed from the waste fluid by a back-flushable filter. Such a back-flushable filter is provided at 30. When the waste influent collected in tank 10 has achieved chemical makeup by means of the addition of chemical additives to the system through the eductor 20, valve 16 is closed and valve 28 is opened. This delivers the waste influent to the back-flushable filter 30 (one example of which may be a back-flushable purification filter commercially available from the Vacco Company). Such a filter may be designed to remove at least 98 percent by weight of the insoluble particulate five mircons or larger in size.

Valves 28 and 34 and the filter 30 are arranged to permit isolation of the filter for back-flushing. A pressurized nitrogen supply cylinder 32 may be provided on the downstream side of the filter and may be used as the driving force for the back-flush operation. Alternatively, a fluid source may be provided through back-flush inlet 82 (said alternate fluid source being described further below). During the back-flushing operation the collected particulates and any back-flushing fluid are permitted to pass through valve 84 into flush water collection tank 86. Since the back-flush operation is practiced only periodically, it takes an unknown period of time for sufficient back-flush fluid and particulates to collect in the tank 86 before further processing is warranted. When sufficient quantities of fluid have collected in the collection tank 86, valves 88, 92 and 106 are opened with valve 96 closed. Pump 90 is then activated to circulate the collected fluid from the collection tank 86 through valve 88 and valve 92 to the inertial filter 80.

The inertial filter 80 may be a unit similar to inertial filters commercially available from the Mott Metallurgical Corporation and which are scale-ups of the Mott Laboratory Model No. 5332. The Mott inertial filter consists of an inner porous tube and an outer sheath tube. The influent is introduced into the inside diameter of the porous tube with a velocity of 12 to 20 feet per second. A restriction Venturi is placed at the main stream effluent outlet at the opposite end of the porous tube. The restriction of the Venturi increases the static pressure within the porous tube resulting in a differential pressure across the porous tube wall causing a flow of fluid, or side stream, to pass through the porous wall into the annular chamber between the porous tube and the sheath. Clear filtrate effluent is tapped from this outer sheath and is delivered through valve 106 and line 104 back to the holding tank 10. The particulate matter in the high velocity fluid within the porous tube of the inertial filter has too much inertia to turn the corner into the porous media. and consequently continues straight through the tube with the main stream fluid. This main stream fluid and the particulate matter is returned through line 94 to the flush water collection tank 86. Recycling of this fluid contained in the flush water collection tank 86 through the inertial filter 80 is continued until the fluid is sufficiently concentrated. At this point, valve 92 is closed and valve 96 is opened to permit discharge of the concentrate to another system which handles the disposal of solid wastes. Such a system (not shown) may simply consist of a mixer for mixing the solid waste concentrate with a binder and a barrel or cask filling and sealing means.

After passing through the filter 30, the clarified waste fluid passes through valve 34 and is collected in the surge tank 36. When a sufficient volume of fluid has been collected in the surge tank 36, pump 38 delivers the waste fluid under pressure to the reverse osmosis concentrator 40. Since most of the solids have been removed from the waste fluid by fliter 30, the reverse osmosis concentrator is capable of operating with a high flow of permeate and a low flow of concentrate. This enables a very high percentage of liquid to pass through the semipermeable membrane 42. This is due to the reduced concentration polarization across the membrane 42 and to the lower osmotic pressure in the influent. In addition, a reduction in dissolved solids by filter 30 increases membrane life by reducing the possibility of fouling. Hence, the combination of the back-flushable filter 30 with the reverse osmosis module 40 permits a very high concentration factor in the reverse osmosis module 40 and results in a relatively pure permeate which is delivered to permeate collection tank 44. If additional treatment of the permeate is required, the permeate may be passed through a conventional ion exchange unit 46 to a monitor tank 48.

While the effluent resides in the monitor tank 48, the effluent may be analyzed to determine the effluent's radioactivity and purity and to determine whether the effluent may be discharged to the environment or whether other recycle or reuse of the effluent is appropriate. If the effluent is to be discharged to the environment, valves 60 and 66 are opened and the effluent is pumped by pump 62 to the discharge 68. If the effluent is to be reused or recycled, valve 66 remains closed and valve 70 is opened so that the pump 62 pumps the effluent through line 64 to the water recycle tank 72. From the water recycle tank 72 the effluent may be pumped through valves 74 and 102 to recycle outlet 78 for reuse in some other system of the fluid may be pumped through valve 100 and delivered to an inlet port 82 of back-flushable filter 30.

Returning now to the reverse osmosis module 40, the reverse osmosis unit acts as a preconcentrator for the thin-film evaporator 50. Accordingly, the concentrate from the reverse osmosis module is passed to the thin-film evaporator 50 where the concentrate is further reduced in volume by the evaporator. A typical thin-film evaporator is a device commercially available from the Kontro Company under the trade designation of the Kontro Reverse Taper Thin-Film Processor and from Luwa Corporation under the name of Luwa Thin-Film Dryer. The concentrate is further reduced in volume by the thin-film evaporator 50 which puts out a concentrate with very high solids content. This concentrate is then delivered to a solid waste processing system by line 58 where the solid waste is appropriately disposed such as by mixing with a binder, drumming, and shipping off of the site. The distillate from the evaporator, which may contain a relatively high concentration of impurities compared to the reverse osmosis concentrator's permeate, is recycled through line 56, valve 52 and check valve 54 to the reverse osmosis inlet in order to maintain the high quality of the process liquid which goes to the monitor tank.

What is claimed is:

1. An apparatus for producing very pure liquids from influent liquids containing high concentrations of impurities while at the same time producing an impurity concentrate of very high concentrations and low volume, wherein the apparatus comprising in combination:
   a. a reverse osmosis concentrator having a semipermeable membrane and having an inlet for receiving a stream of waste fluid, an outlet for discharging purified permeate which has passed through said semipermeable membrane, and an outlet for discharging a concentrate;
   b. a thin-film evaporator connected to said reverse osmosis concentrator's concentrate outlet, said thin-film evaporator having an outlet for discharging a distillate and an outlet for discharging a concentrate having a high solids content;
   c. means upstream of said reverse osmosis concentrator for filtering the stream of waste fluid, said filter means including a means for back-flushing said filtering means with a cleaning fluid; and
   d. means upstream of said filtering means for introducing chemicals into the stream of waste fluid, said chemical introduction means including:
      1. a hold-up tank for collecting the stream of waste fluid;
      2. a pump in fluid communication with said hold-up tank;
      3. a recirculation line connecting said pump and said hold-up tank;
      4. an eductor in said recirculation line, said eductor having a primary inlet and a secondary inlet, said primary inlet being in fluid communication with said pump; and
      5. a source of chemical additive, said source being connected to said secondary inlet of said eductor such that the chemicals from said chemical source are selectively entrained in the flow of fluid passing through said eductor.

2. The apparatus as recited in claim 1 further including means for recycling the distillate discharged from said thin-film evaporator to the stream of waste fluid upstream of said reverse osmosis concentrator.

3. The apparatus as recited in claim 2 further including a means connected to said filter for receiving and treating said cleaning fluid after it has flushed said filtering means, said receiving and treating means including: a collection tank for receiving said cleaning fluid, a pump for pumping said cleaning fluid out of said collection tank, an inertial filter connected to said pump for separating said cleaning fluid into clarified effluent and a concentrate, and a recycling conduit for returning said concentrate to said collection tank.

4. The apparatus as recited in claim 3 further including an ion exchange demineralizer for further demineralizing said purified permeate discharged from said reverse osmosis module.

* * * * *